United States Patent
Wang et al.

(10) Patent No.: US 6,829,397 B2
(45) Date of Patent: Dec. 7, 2004

(54) DUAL FIBER BRAGG GRATING STRAIN SENSOR SYSTEM

(75) Inventors: Li-Karn Wang, Hu-Kou (TW); Yen-Ju Chiang, Yunghe (TW); Chih-Chung Yang, Taipei (TW)

(73) Assignee: National Tsing Hua University, Hsinchu (TW)

( * ) Notice: Subject to any disclaimer, the term of this patent is extended or adjusted under 35 U.S.C. 154(b) by 56 days.

(21) Appl. No.: 10/294,731

(22) Filed: Nov. 15, 2002

(65) Prior Publication Data

US 2003/0194167 A1 Oct. 16, 2003

(30) Foreign Application Priority Data

Apr. 10, 2002 (TW) ...................................... 91107258 A

(51) Int. Cl.[7] .............................. G02B 6/00; G02B 6/34

(52) U.S. Cl. .......................................... 385/12; 385/37

(58) Field of Search .............................. 385/12, 13, 37; 336/32, 35.5, 478; 73/800

(56) References Cited

U.S. PATENT DOCUMENTS

| | | | | |
|---|---|---|---|---|
| 5,945,666 A | | 8/1999 | Kersey et al. | 250/227.14 |
| 5,986,749 A | * | 11/1999 | Wu et al. | 356/35.5 |
| 6,018,160 A | * | 1/2000 | Bennion et al. | 356/32 |
| 6,024,488 A | * | 2/2000 | Wu et al. | 385/12 |
| 6,204,920 B1 | | 3/2001 | Ellerbrock et al. | 356/345 |
| 6,414,303 B1 | * | 7/2002 | Kersey | 385/13 |
| 6,462,329 B1 | * | 10/2002 | Davis et al. | 385/37 |
| 6,489,606 B1 | * | 12/2002 | Kersey et al. | 385/13 |
| 6,586,722 B1 | * | 7/2003 | Kenny et al. | 385/37 |
| 6,647,160 B1 | * | 11/2003 | Chi et al. | 385/12 |
| 6,668,105 B2 | * | 12/2003 | Chen et al. | 385/13 |
| 6,674,928 B2 | * | 1/2004 | Johnson et al. | 385/12 |

OTHER PUBLICATIONS

Alan D. Kersey, et al.; Fiber Grating Sensors; Aug. 1977.

Gregg A. Johnson, et al.; Fiber Bragg Grating Interrogation and Multiplexing with a 3×3 Coupler and a Scanning Filter; Aug. 2000.

A.D. Kersey et al.;High–Resolution Fibre–Grating Based Strain Sensor with Interferometric Wavelength–Shift Detection, Jan. 30, 1992.

A Ezbiri, et al.;High–Resolution Fibre Bragg Grating Sensor Demodulation Using a Diffraction Grating Spectrometer and CCD Detection.

A. Arie, et al.; Static Fiber–Bragg Grating Strain Sensing Using Frequency–Locked Lasers; Journal of Lightwave Technology, vol. 17, No. 10, Oct. 1999.

L.A. Ferreira, et al.;Frequency–Modulated Multimode Laser Diode for Fiber Bragg Grating Sensors; Journal of Lightwave Technology, vol. 16, No. 9, Sep. 1998.

M.A. Davis, et al.; Interrogation of 60 Fibre Bragg Grating Sensors with Microstrain Resolution Capability; Electronic Letters; Jul. 18, 1996.

R.W. Fallon et al.; Multiplexed Identical Broad–Band–Chirped Grating Interrogation System for Large–Strain Sensing Applications; Dec. 1997.

(List continued on next page.)

*Primary Examiner*—John R. Lee
*Assistant Examiner*—James P. Hughes
(74) *Attorney, Agent, or Firm*—Troxell Law Office PLLC

(57) ABSTRACT

The present invention provides a dual fiber Bragg grating strain sensor system, which comprises a broadband light source, a power reading unit, and a sensor unit having a first fiber Bragg grating and a second fiber Bragg grating placed adjacent to each other; wherein the broadband light reaches said sensor unit through said power reading unit, the light that corresponds to the intersection between the spectra of the two FBGs is backreflected and is detected by an optical power meter/detector at the detection port.

28 Claims, 15 Drawing Sheets

OTHER PUBLICATIONS

M.G. Xu et al; Discrimination Between Strain and Temperature Effects Using Dual–Wavelength Fibre Grating Sensors; Electronic Letters; Jun. 23, 1994.

Bai–Ou Guan et al; Simultaneous Strain and Temperature Measurement Using a Superstructure Fiber Bragg Grating; IEEE Photonics Technology Letters, Jun. 2000.

Wei–Chong Du et al.; Fibre Bragg Grating Cavity Sensor for Simultaneous Measurement of Strain and Temperature; IEEE Photonics Technology Letters, Jan. 1999.

Sungchul Kim et al; Temperature–Independent Strain Sensor Using a Chirped Grating Partially Embedded in a Glass Tube; ; IEEE Photonics Technology Letters, Jun. 2000.

* cited by examiner

DUAL FIBER BRAGG GRATING STRAIN SENSOR SYSTEM

REFERENCE CITED

[1] A. D. Kersey, M. A. Davis, H. J. Patrick, M. LeBlanc, K. P. Koo, C. G. Askins, M. A. Putnam, and E. J. Friebele, "Fiber grating sensor," J. Lightwave Technol. 15, 1442–1463, (1997).

[2] P. J. Ellebrock and et al, "Optical fiber sensor system" U.S. Pat. No. 6,204,920, (2001)

[3] G. A. Johnson, M. D. Todd, B. L. Althouse, and C. C. Chang, "Fiber Bragg grating interrogation and multiplexing with a 3×3 coupler and a scanning filter," J. Lightwave Technol. 18, 1101–1105, (2000).

[4] A. D. Kersey, T. A. Berkoff, and W. W. Morey, "High-resolution fiber-grating-based strain sensor with interferometric wavelength-shift detection," Electron. Lett. 28, 236–238, (1992).

[5] A. Ezbiri, A. Munoz, S. E. Kanellopoulos, and V. A. Handerek, "High resolution fiber Bragg grating sensor demodulation using a diffraction grating spectrometer and CCD detection," in IEE Colloquium on Optical Techniques for Smart Structures and Structural Monitoring, Digest 1997 —033 —Institute of Electrical Engineers, London, U.K., (1997).

[6] A. Arie, B. Lissak, and M. Tur, "Static fiber-Bragg grating strain sensing using frequency-locked lasers," J. Lightwave Technol. 17, 1849–1854, (1999).

[7] L. A. Ferreira, E. V. Diatzikis, J. L. Santos, and F. Farahi, "Frequency-modulated multimode laser diode for fiber Bragg grating sensors," J. Lightwave Technol. 16, 1620–1630, (1998).

[8] M. A. Davis, D. G. Bellemore, M. A. Putnam, and A. D. Kersey "Interrogation of 60 fiber Bragg grating sensors with microstrain resolution capability," Electron. Lett. 32, 1393–1394, (1996).

[9] R. W. Fallon, L. Zhang, A. Gloag, and I. Bennion, "Multiplexed identical broadband chirped grating interrogation system for large strain sensing application," IEEE Photon. Technol. Lett. 9, 1616–1618, (1997).

[10] M. G. Xu, J. L. Archambault, L. Reekie, and J. P. Dakin, "Discrimination between strain and temperature effects using dual-wavelength fiber grating sensors," Electron. Lett. 30, 1085–1087, (1994).

[11] B. 0. Guan, H. Y. Tam, X. M. Tao, and X. Y. Dong, "Simultaneous strain and temperature measurement using a superstructure fiber Bragg grating," IEEE Photon. Technol. Lett. 12, 675–677, (2000).

[12] W. C. Du, X. M. Tao, and H. Y. Tam, "Fiber Bragg grating cavity sensor for simultaneous measurement of strain and temperature," IEEE Photon. Technol. Lett. 11, 105–107, (1999).

[13] A. D. Kersey and et al, "Hybrid fiber Bragg grating/long period fiber grating sensor for strain/temperature discrimination" U.S. Pat. No. 5,945,666, (1999).

[14] S. Kim, J. Kwon, S. Kim, and B. Lee, "Temperature independent strain sensor using chirped grating partially embedded in a glass tube," IEEE Photon. Technol. Lett. 12, 678–680, (2000).

FIELD OF THE INVENTION

The present invention relates to a fiber grating system, particularly to a dual fiber Bragg grating strain sensor system for operating in a temperature-independent mode.

BACKGROUND OF THE INVENTION

Prior Arts

Intracore fiber Bragg gratings (FBGs) have become attractive optical components for sensing because of their compactness and wavelength-encoding capability. When the FBGs are applied as sensors, the measurands can be temperature, strain, pressure, magnetic field, and others[1, 2]. These measurands are determined by detecting the wavelength shift (i.e., the Bragg wavelength shift) of the light backreflected from the FBGs. In either a single-point sensor or a multiplexed sensor system, the Bragg wavelength shift can be measured by employing a wavelength interrogation scheme with a tunable filter[3], an interferometer[4], a diffraction grating and CCD spectrometer[5], a frequency-locking circuit[6], or a frequency-modulated multimode laser[7].

Strain measurement with FBGs has been an important subject in applications associated with monitoring stressed composite materials. A sensor system with an array of wavelength-multiplexed FBGs has been widely proposed for strain measurement in a smart structure[8,9]. Many FBG strain sensor systems have been further developed to operate in a temperature-independent mode. For an ac strain measurement, use of a single FBG in conjunction with a local locking circuit can suffice to discriminate the ac strain response from the slowly varying temperature response. However, it is not possible to do so with only one FBG used for measuring a static or quasi-static strain. Various methods have been proposed to resolve this situation. A frequently used method is to utilize a pair of FBGs written into the same location to form a superstructure that exhibits different sensitivities to temperature and strain[10,11]. Dual FBGs could also be structured to form a cavity for simultaneous measurement of strain and temperature[12]. Dual fiber Bragg gratings can also combine with a long period fiber grating to discriminate temperature and strain[13]. These methods require calibration for the two sensitivities of each FBG in advance, resulting in some complexity in application. However, note that some temperature independent strain measurements have been carried out without such calibration by simply nullifying the strain sensitivity of one FBG while keeping the same temperature sensitivity for both FBGs. A recent case of temperature-independent strain sensing exemplified this by employing a chirped FBG partially embedded in a glass tube to obtain a direct optical power-detection scheme[14]. Although simple in structure, this detection scheme has not yet provided a solution to linear and accurate strain measurement.

Objects of this Invention

The present invention provides a temperature-independent fiber Bragg grating strain sensor system with specific sensor(s) to improve the strain-sensing interfered by temperature.

In the aspect of detection, this invention further incorporates the use of optical power detector in the detection port to measure the variation of strain; thus, it is not necessary to utilize an expensive equipment for measuring fine variation of Bragg wavelength and neither to utilize complex digital signal process chips for signals from different locations. Instead, this invention adapts cheap power reading unit(s) to detect the optical power responded from the sensor unit(s) at different locations. Comparing with the prior arts, the present invention costs much lower. Besides, this invention can be a temperature-independent multipoint strain sensor system, which can be obtained in accordance with the result of experiment. In another word, the sensor unit(s) can sense the variation of strain in multiple locations without cross talk. Furthermore, the system provided in this invention also utilizes an optical power splitter to split the broadband light for a plurality of power reading units; thus, it can sense multipoint strain variation in a temperature independent mode.

The present invention provides a relatively cheap and easy way to produce temperature-independent multipoint strain sensor system without separating the reflection spectra of fiber Bragg gratings in different sensor units.

The main object of the present invention is to provide a temperature-independent strain sensor system.

The other object of this invention is to provide a relatively cheap strain sensor system.

Another object of this invention is to provide a temperature-independent multipoint strain sensor system.

SUMMARY OF THE INVENTION

The present invention provides a dual fiber Bragg grating strain sensor system, which comprises a broadband light source, an optical power reading unit, and a sensor unit having a pair of fiber Bragg gratings (FBG's). It is required that the reflection spectra of these FBGs be either identical or slightly overlapped, and that the pair of FBGs be structured so that only one is insusceptible to strain effect while both have the same temperature sensitivity. The latter requirement can be realized by embedding one of the FBGs in a thin glass tube sealed with glue at both ends and keeping the other FBG free but placing it adjacent to the tubed FBG. This design is particularly important when the sensor is embedded in a stressed material to insure that both FBGs have an identical thermal effect but experience different strain effects. The present invention also provides an optical power detection scheme for temperature-independent strain measurements.

The following detailed description and figures are provided to help understand the objects and features of the present invention.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to help understand the features and the structures of the present invention.

Figure 1:
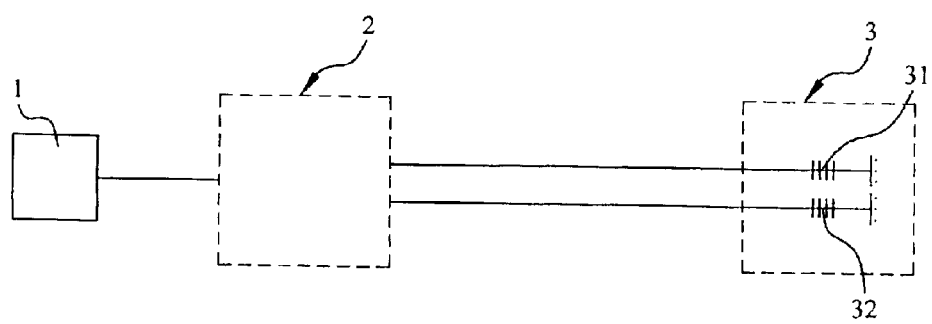
FIG. 1 shows a diagram of the present invention.
Figure 7A:
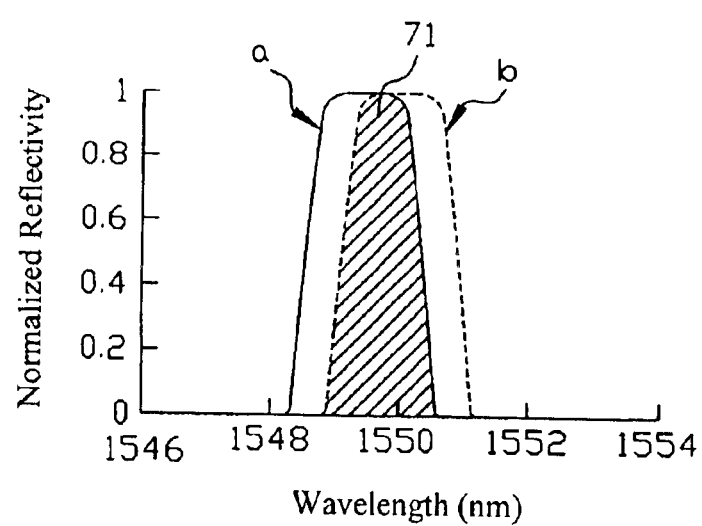
FIGS. 7A and 7B are reflection spectra of the fiber Bragg gratings of a sensor unit in accordance with the present invention; a and b represent the reflection spectra; the shaded area 71 is the overlapping region.
Figure 7B:
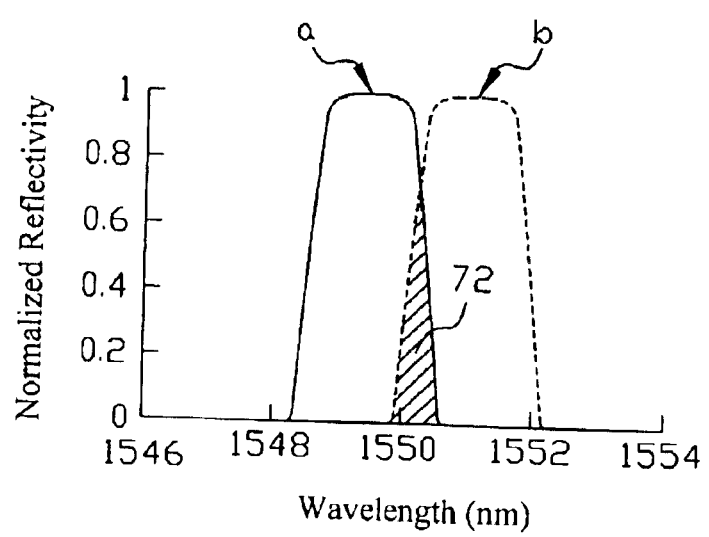

The present invention, Dual Fiber Bragg Grating Strain Sensor System, as referred to in FIG. 1, comprises a broadband light source 1, an optical power reading unit 2, and a sensor unit 3 having a fiber Bragg grating 31 and a fiber Bragg grating 32 written separately on two different fibers. It is required that the reflection spectra of these FBGs be either identical or slightly overlapped (as shown in FIGS. 7A and 7B, where a and b represent the reflection spectra, and the shaded area 71 is the overlapping region between the two spectra), and that the pair of FBGs be structured so that only one is insusceptible to strain effect while both have the same temperature sensitivity. The latter requirement can be realized by embedding FBG 31 in a thin glass tube sealed with glue at both ends and keeping FBG 32 free but placing it adjacent to the tubed FBG 31. Note that FBG 32 can also be protected with a tube and left free in the tube experiencing extension/contraction when the fiber line outside the tube is under axial stress. This design is particularly important when the sensor is embedded in a stressed material to insure that both FBGs have an identical thermal effect but experience different strain effects. To explain the principle of operation of the sensing scheme, we assume that the reflection spectra of both FBGs are almost identical both in shape and in central wavelength (as shown in FIG. 7A, although slightly overlapping spectra in FIG. 7B can work as well). When a broadband light from 1 reaches FBG 31 the light at its reflection band is backreflected and directed to FBG 32 through an optical power reading unit 2. Now only the part of light that corresponds to the intersection between the spectra of the two FBGs is backreflected by FBG 32 and finally goes through an optical power reading unit 2 and is detected by an optical power meter/detector.

Figure 2:
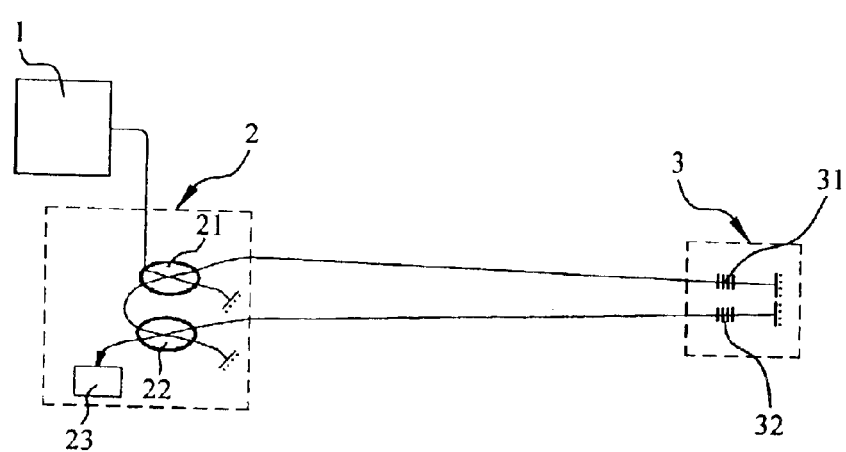
FIG. 2 is a diagram of an embodiment example in accordance with the FIG. 1.
Figure 3:
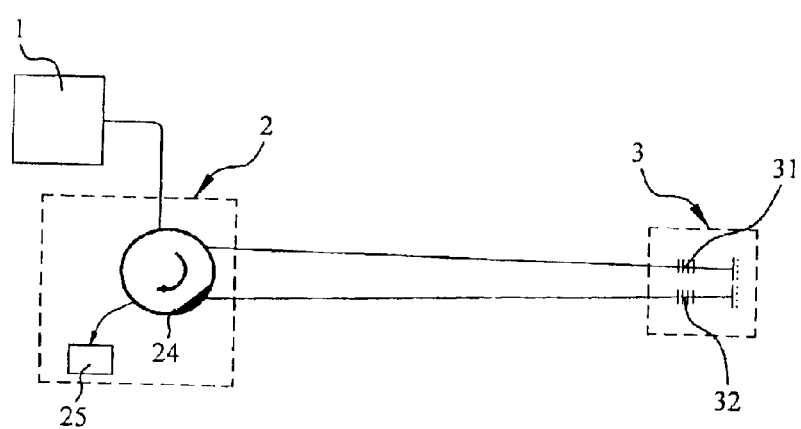
FIG. 3 is a diagram of another embodiment example in accordance with the FIG. 1.
Figure 8:
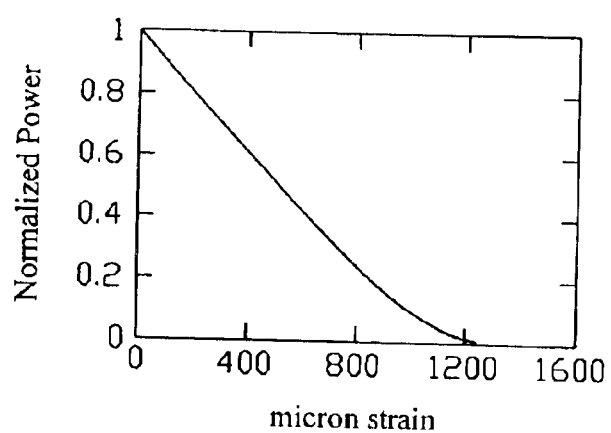
FIG. 8 is a strain-detected power diagram in accordance with the present invention.

FIG. 2 shows an embodiment example of the present invention. The optical power reading unit 2 may further comprise a fiber coupler 21, a fiber coupler 22, and a detection port 23. When a broadband light from 1 reaches FBG 31 through coupler 21, the light at its reflection band is backreflected and directed to FBG 32 through fiber couplers 21 and then 22. Now only the part of light that corresponds to the intersection between the spectra of the two FBGs is backreflected by FBG 32 and finally goes through a fiber coupler 22 and is detected by an optical power meter/detector at power-detection port 23. Because FBG 32 experiences a strain effect (while FBG 31 does not in the designed tubing structure), its reflection spectrum shifts in accordance with the strain. This induces a change in the intersection of the two reflection spectra and accordingly a variation in the detected optical power. Because both FBGs have an identical thermal effect in the design, the spectral shift from temperature influence is canceled, while only the strain effect is kept. And this leads to a temperature-independent strain-sensing scheme. To avoid Fresnel reflections that would be superimposed onto the useful signal, antireflection coatings or beveled facets are needed at the extremities of the fibers. However, index matching fluids can be used to have the same function. To see how this sensor system would result in a linear strain measurement, please refer to the strain-optical power diagram in FIG. 8. It shows a linear behavior in the range from 0 to more than 900 micron strain. In an alternative embodiment example of this invention as shown in FIG. 3, the power reading unit 2 may comprise an optical circulator 24 and a detection port 25. When a broadband light from 1 reaches FBG 31 through the optical circulator 24, the light at its reflection band is backreflected and directed to FBG 32 through the optical circulator 24. Now only the part of light that corresponds to the intersection between the spectra of the two FBGs is backreflected by FBG 32 and finally goes through the optical circulator 24 and is detected by an optical power meter/detector at the power-detection port 25.

Figure 4:
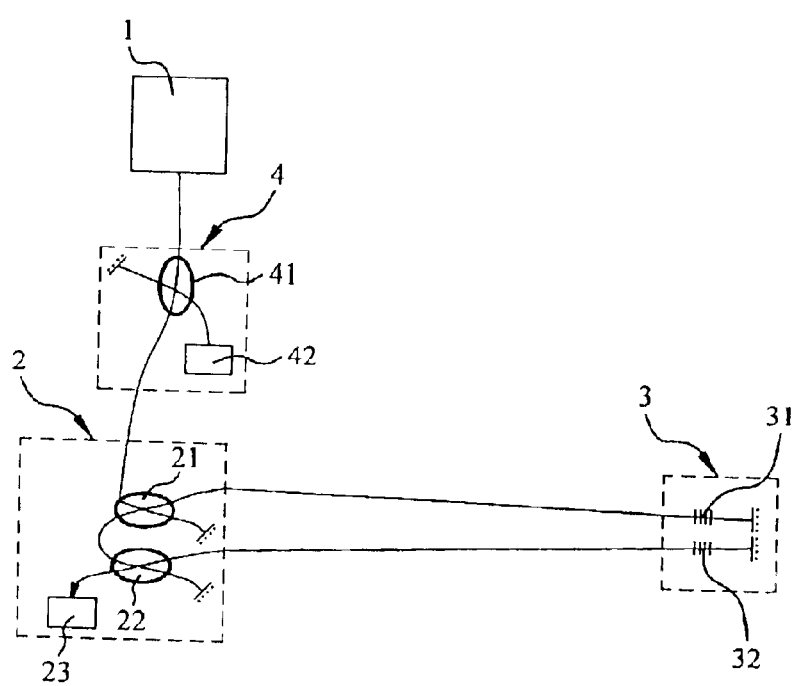
FIG. 4 shows a diagram of an embodiment example in accordance with the present invention.

The variations of the optical source power and the connector loss (particularly at the source-fiber joint) can present a problem for long-term application in the power-detection scheme, because such variations may be falsely interpreted as a strain change. To resolve this problem (please refer to FIG. 4), the dual fiber Bragg grating strain sensor system comprises a broadband light source 1, a calibration system 4, an optical power reading unit 2, and a sensor unit 3 having a fiber Bragg grating 31 and a fiber Bragg grating 32 written separately on two different fibers. It is required that the reflection spectra of these FBGs be either identical or slightly overlapping (as shown in FIGS. 7A and 7B), and that the pair of FBGs be structured so that only one is insusceptible to strain effect while both have the same temperature sensitivity. The latter requirement can be realized by embedding FBG 31 in a thin glass tube sealed with glue at both ends and keeping FBG 32 free but placing it adjacent to the tubed FBG 31. Note that FBG 32 can also be protected with a tube and left free in the tube experiencing extension/contraction when the fiber line outside the tube is under axial stress. This design is particularly important when the sensor is embedded in a stressed material to insure that both FBGs have an identical thermal effect but experience different strain effects. The power reading unit 2 provided by this invention may further comprises a fiber coupler 21, a fiber coupler 22, and a detection port 23. A broadband light from 1 goes through the calibration system 4 and is directed to the optical power reading unit 2. When the broadband light reaches FBG 31 the light at its reflection band is backreflected and directed to FBG 32 through fiber coupler 21 and then fiber coupler 22. Now only the part of light that corresponds to the intersection between the spectra of the two FBGs is backreflected by FBG 32 and finally goes through the fiber coupler 22 and is detected by an optical power meter/detector at the detection port 23. In the system as shown in FIG. 4 the optical power reading unit 2 may be constructed as that in FIG. 3.

In a preferred embodiment example (please refer to FIG. 4), the calibration system 4 further comprises a fiber coupler 41 and a referencing port 42. A detector at the referencing port 42 can be used to monitor dynamically the optical power entering the sensing system for power referencing, where the fiber coupler 41 is used to tap out part of the input power to the referencing port 42. By calibrating the detected optical power at detection port 23, the problem caused by the variations of the optical source power and the connector loss (particularly at the source-fiber joint) can be eliminated.

Figure 5A:
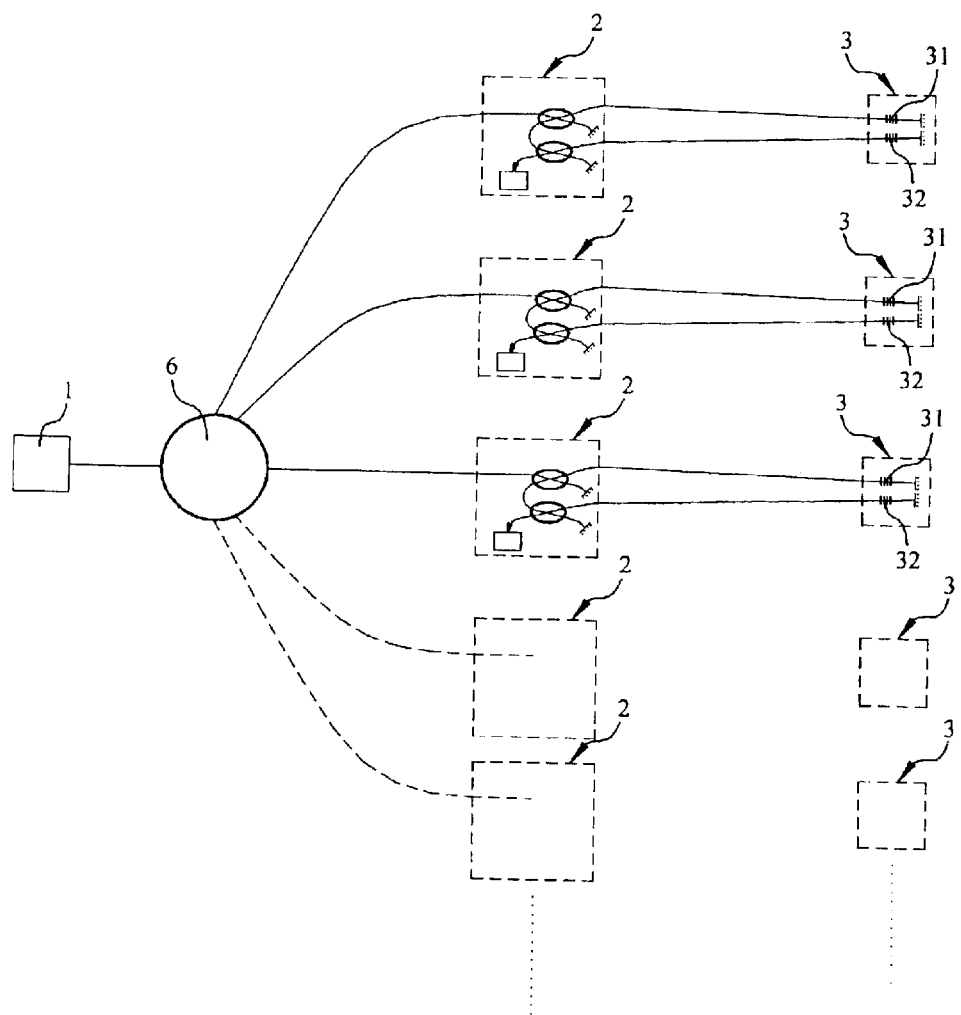
FIG. 5A shows a diagram of an embodiment example with multipoint sensor units in accordance with the present invention.
Figure 5B:
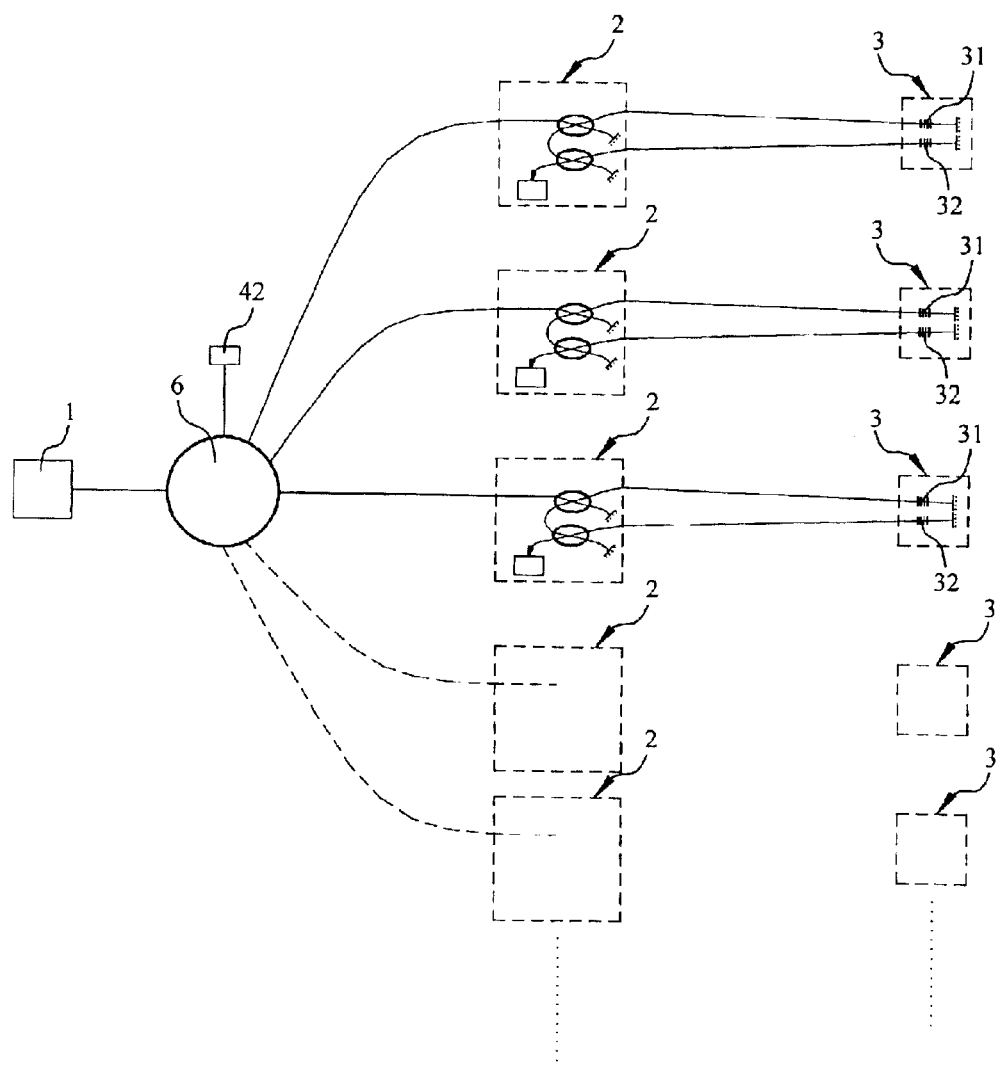
FIG. 5B shows a diagram of the other embodiment example with multipoint sensor units in accordance with the present invention.

Besides, one object of this invention is to provide a temperature-independent multipoint strain sensor system (please refer to FIG. 5A), which comprises a broadband light source 1, a power splitter 6, a plurality of power reading units 2, and a plurality of sensor units 3 having a fiber Bragg grating 31 and a fiber Bragg grating 32 written separately on two different fibers in each sensor unit 3. It is required that the reflection spectra of these FBGs in each sensor unit 3 be either identical or slightly overlapping (as shown in FIGS. 7A and 7B), and that the pair of FBGs be structured so that only one is insusceptible to strain effect while both have the same temperature sensitivity. The latter requirement can be realized by embedding FBG 31 in a thin glass tube sealed with glue at both ends and keeping FBG 32 free but placing it adjacent to the tubed FBG 31. Note that FBG 32 can also be protected with a tube and left free in the tube experiencing extension/contraction when the fiber line outside the tube is under axial stress. This design is particularly important when the sensor is embedded in a stressed material to insure that both FBGs have an identical thermal effect but experience different strain effects. In addition, (please refer to FIG. 2) each power reading unit 2 (as shown in FIG. 5A) provided by this invention may further comprises a fiber coupler 21, a fiber coupler 22, and a detection port 23. Referring to FIG. 2 and FIG. 5A, when the light from the broadband light source 1 split by the power splitter 6 reaches FBG 31 of each sensor unit 3 through fiber coupler 21, the light at its reflection band is backreflected and directed to FBG 32 through the fiber coupler 21 and then fiber coupler 22. Now only the part of light that corresponds to the intersection between the spectra of the two FBGs is backreflected by FBG 32 and finally goes through the fiber coupler 22 and is detected by an optical power meter/detector at the detection port 23. In addition, as in an alternative embodiment example of this invention (as shown in FIG. 3), each power reading unit 2 may comprise an optical circulator 24 and a detection port 25. Referring to FIG. 3 and FIG. 5A, when the light from the broadband light source 1 split by the power splitter 6 reaches FBG 31 of each sensor unit 3 through the optical circulator 24, the light at its reflection band is backreflected and directed to FBG 32 through the optical circulator 24. Now only the part of light that corresponds to the intersection between the spectra of the two FBGs is backreflected by FBG 32 and finally goes through the optical circulator 24 and is detected by an optical power meter/detector at the detection port 25. Normally, the variations of the optical source power and the connector loss (particularly at the source-fiber joint) can present a problem for long-term application in the power-detection scheme, because such variations may be falsely interpreted as a strain change. To resolve this problem (please refer to FIG. 5B), the present invention also comprises a referencing port 42 for calibrating the detected optical power at detection port 25.

Figure 6:
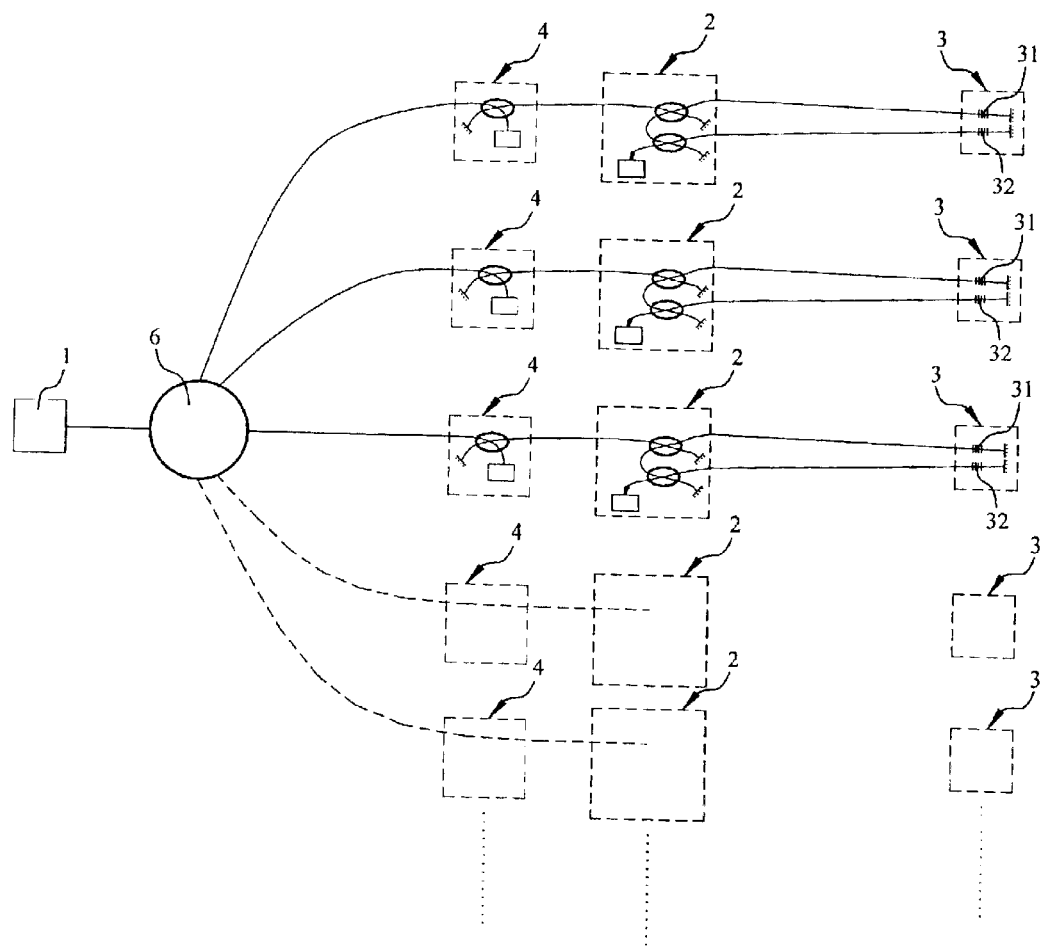
FIG. 6 shows a diagram of another embodiment example with multipoint sensor units in accordance with the present invention.

Another means for eliminating the aforementioned variations of the optical source power and the connector loss for a temperature-independent multipoint strain sensor system is as shown in FIG. 6. Referring to FIG. 6, the present invention comprises a broadband light source 1, a power splitter 6, a plurality of calibration systems 4, a plurality of optical power reading units 2, and a plurality of sensor units 3 having a fiber Bragg grating 31 and a fiber Bragg grating 32 written separately on two different fibers of each sensor unit 3. It is required that the reflection spectra of these FBGs in each sensor unit 3 be either identical or slightly overlapping (as shown in FIGS. 7A and 7B), and that the pair of FBGs be structured so that only one is insusceptible to strain effect while both have the same temperature sensitivity. The latter requirement can be realized by embedding FBG 31 in a thin glass tube sealed with glue at both ends and keeping FBG 32 free but placing it, adjacent to the tubed FBG 31. Note that FBG 32 can also be protected with a tube and left free in the tube experiencing extension/contraction when the fiber line outside the tube is under axial stress. This design is particularly important when the sensor is embedded in a stressed material to insure that both FBGs have an identical thermal effect but experience different strain effects. Furthermore, (please refer to the FIG. 2) each power reading unit 2 in FIG. 6 may comprise a fiber coupler 21, a fiber coupler 22, and a detection port 23. Referring to FIG. 2 and FIG. 6, when the light from the broadband light source 1 split by the power splitter 6 reaches FBG 31 of each sensor unit 3 through each calibration system 4 and each optical power reading unit 2 sequentially, the light at its reflection band is backreflected and directed to FBG 32 through the fiber coupler 21 and then fiber coupler 22. Now only the part of light that corresponds to the intersection between the spectra of the two FBGs is backreflected by FBG 32 and finally goes through the fiber coupler 22 of each optical power reading unit 2 and is detected by an optical power meter/detector at the detection port 23. In addition, as in an alternative embodiment example of this invention (as shown in FIG. 3), each power reading unit 2 may comprise an optical circulator 24 and a detection port 25. Referring to FIG. 3 and FIG. 6, when the light from the broadband light source 1 split by the power splitter 6 reaches FBG 31 of each sensor unit 3 through each calibration system 4 and each optical power reading unit 2 sequentially, the light at its reflection band is backreflected and directed to FBG 32 through the optical circulator 24. Now only the part of light that corresponds to the intersection between the spectra of the two FBGs is backreflected by FBG 32 and finally goes through the optical circulator 24 of each optical power reading unit 2 and is detected by an optical power meter/detector at the detection port 25. In a preferred embodiment example (please refer to the FIG. 4 and FIG. 6), each calibration system 4 (as shown in the FIG. 6) further comprises a fiber coupler 41 and a referencing port 42. When the light from the broadband light source 1 split by the power splitter 6 reaches each sensor unit 3 through the fiber coupler 41 of every calibration system 4 and every power reading unit 2 sequentially, a detector at each referencing port 42 can be used to monitor dynamically the optical power entering the sensing scheme for power referencing, where the fiber coupler 41 is used to tap out part of the input power to the referencing port 42. By calibrating the detected optical power at detection port 23, the problem caused by the variations of the optical source power and the connector loss (particularly at the source-fiber joint) can be eliminated.

Figure 9A:
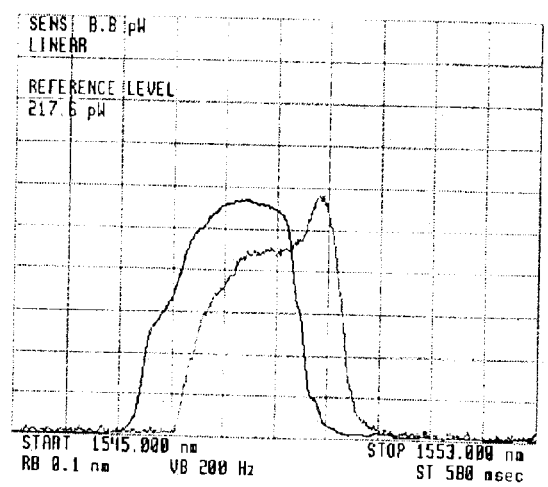
FIGS. 9A~9C are normalized individual reflection spectra with multipoint sensor units.
Figure 9B:
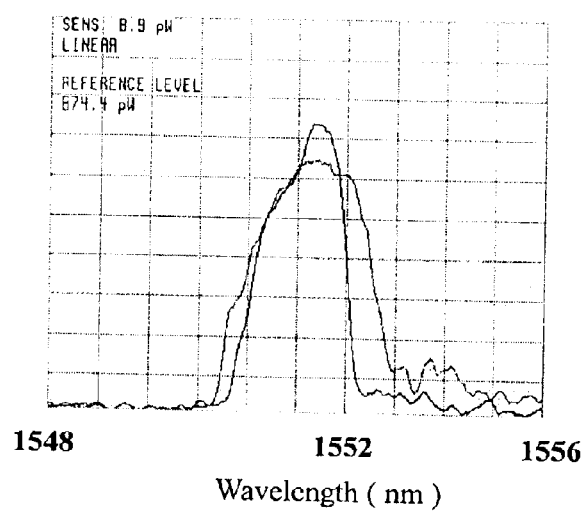
Figure 9C:
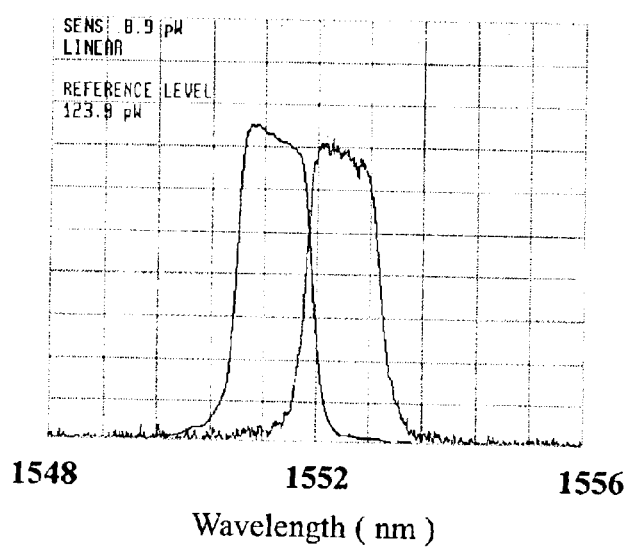
Figure 10A:
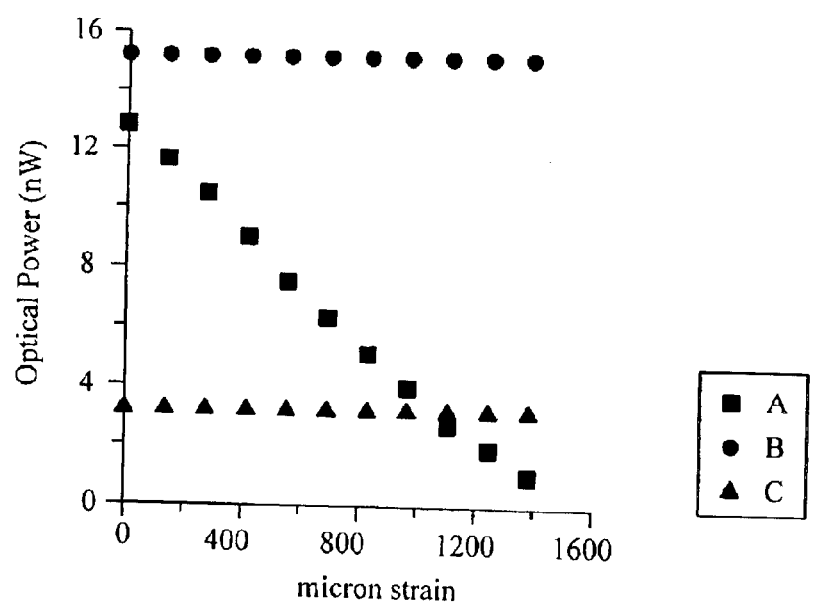
FIG. 10A shows a diagram of detected power versus strain at three different locations (A, B, and C) with each location having a sensor unit.
Figure 10B:
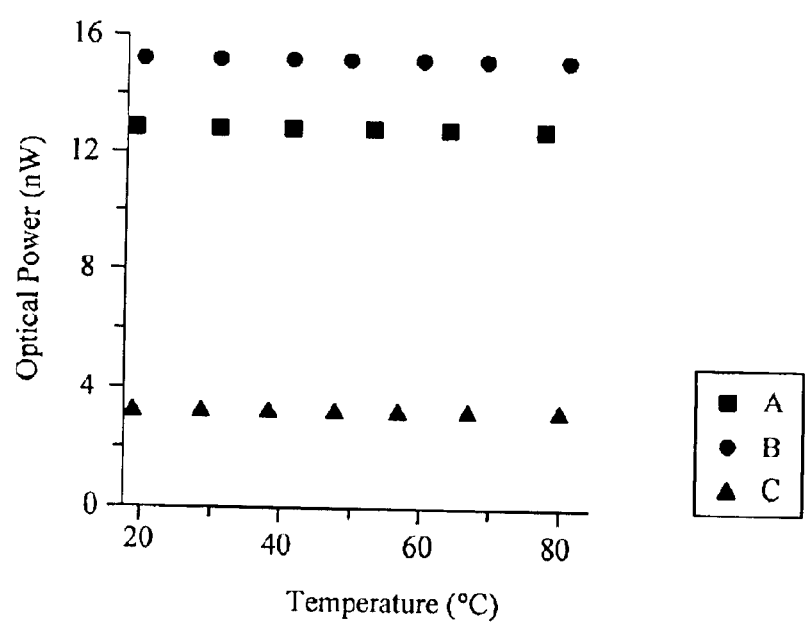
FIG. 10B shows a diagram of detected power versus temperature at three different locations (A, B, and C) with each location having a sensor unit.

For example, referring to FIGS. 9A~9C, which represent the reflection spectra of different sensor units located at different locations, respectively (say, located at A, B and C, respectively). In FIG. 9A and FIG. 9B, each pair of reflection spectra are substantially overlapped, and the pair of reflection spectra in the FIG. 9C is partially overlapped. The reflection spectra in FIGS. 9B and 9C are focused at 1552 nm, so that the present invention can have reflection spectra at the same wavelength (also can be at different wavelengths) at different locations, which is quite different from the conventional multipoint strain sensor system (in which all FBG's need to be spectrally separate). When only the sensor unit located at "A" has stress applied thereon, its optical power variation is measured (by an optical power reading unit) as shown by the filled squares in FIG. 10A. (The filled circles and triangles are for the sensor units located at "B" and "C", respectively, which are both unstressed.) The experimental results in FIG. 10A also show that no cross talk can be incurred among the sensor units. Besides, the sensor unit located at "A" still is detected with the feature of linearity. In addition, the three sensor units located at "A", "B" and "C" experience temperature change separately. As shown in FIG. 10B, it is obvious that all sensor units still have the same optical power when temperature changes.

This system according to the present invention employs two fiber Bragg grating (having substantially overlapping or slightly overlapping reflection spectra), which has the feature of temperature-independence by placing the two fiber Bragg gratings adjacent to each other in each sensor unit. A power reading unit is used for detecting the strain variations independent of temperature change. Moreover, the power reading mechanism according to this invention can employ some cheap optical power reading units to detect the strain variations. The experimental results show quite linear behavior of sensitivity at ±1 $\mu$S, and the linearity is observed to be ±0.38% in the range of 0–970 $\mu$S. Then, the experiments with temperature set between 22° C.~80° C. can lead to the results that the change in optical power detected at the detection port due to temperature variation is smaller than ±0.8%. Therefore, it performs as a temperature-independent multipoint strain sensor system.

Furthermore, a power splitter is used for splitting the light from broadband light source to every sensor unit for detecting every different optical power variations caused by different strains induced at different locations. It takes advantage of detecting strain in a large area in a temperature independent mode. The reflection spectra of fiber Bragg gratings for different sensor units are not necessary to be separate in wavelength. The number of sensor units according to the present invention can be increased obviously. And in this invention, even very little overlapping in reflection spectra can be detected by this temperature-independent strain sensor system.

In conclusion, the present invention provides a cheap, temperature-independent, and multipoint strain sensor system with fiber Bragg gratings.

In summation of the foregoing section, the improved strain sensor system of the invention therein is an invention of reasonable perfection that not only possesses better practicality of temperature-independence, but has an calibration system for monitoring optical power variations of the broadband light source and the connector loss and, furthermore, the multipoint sensor units used for larger area sensing is progressive and not only a conception based on familiarity of utilization; therefore, the invention herein fully complies will all new patent application requirement and is hereby submitted to the patent bureau for review and the granting of the commensurate patent rights.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. A dual fiber Bragg grating strain sensor system, which comprises:

a broadband light source;

a power reading unit; and a sensor unit having two fiber Bragg gratings (FBGs) including a first fiber Bragg grating written on a first fiber and a second fiber Bragg grating written on a second fiber, the first fiber Bragg grating is placed adjacent to the second fiber Bragg grating, wherein the broadband light reaches said sensor unit through said power reading unit, and said first fiber Bragg grating and said second fiber Bragg grating reflect light that corresponds to an intersection between a spectra of the two FBGs to said power reading unit, said power reading unit detecting a signal corresponding to the reflected light.

2. The system of claim 1, wherein said first fiber Bragg grating and said second Bragg grating of said sensor unit have a same temperature sensitivity.

3. The system of claim 1, wherein one of said first fiber Bragg grating and said second Bragg grating of said sensor unit is protected by a specific material having a different strain sensitivity.

4. The system of claim 1, wherein both said first fiber Bragg grating and said second Bragg grating of said sensor unit are protected by a specific material, respectively, having a different strain sensitivity.

5. The system of claim 1, wherein said power reading unit further comprises a first fiber coupler, a second fiber coupler, and a detection port;

the broadband light reaches said sensor unit through said first fiber coupler and said second fiber coupler; and said first fiber Bragg grating and said second fiber Bragg grating reflect the light that corresponds to the intersection between the spectra of the two FBGs to said detection port through said second fiber coupler.

6. The system of claim 1, wherein said power reading unit further comprises an optical circulator and a detection port;

the broadband light reaches said sensor unit through said optical circulator, and said first fiber Bragg grating and said second fiber Bragg grating reflect the light that corresponds to the intersection between the spectra of the two FBGs to said detection port through said optical circulator.

7. A dual fiber Bragg grating strain sensor system, which comprises:
a broadband light source;
a calibration system;
a power reading unit; and
a sensor unit having two fiber Bragg gratings (FBGs) including a first fiber Bragg grating written on a first fiber and a second fiber Bragg grating written on a second fiber, the first fiber Bragg grating is placed adjacent to the second fiber Bragg grating;

wherein the broadband light reaches said sensor unit through said calibration system and said power reading unit, and said first fiber Bragg grating and said second fiber Bragg grating reflect a light that corresponds to an intersection between a spectra of the two FBGs to said power reading unit, said power reading unit detecting a signal corresponding to said reflected light.

8. The system of claim 7, wherein said first fiber Bragg grating and said second Bragg grating of said sensor unit are placed adjacent to each other for having the have a same temperature sensitivity.

9. The system of claim 7, wherein one of said first fiber Bragg grating and said second Bragg grating of said sensor unit is protected by a specific material having different strain sensitivity.

10. The system of claim 7, wherein both said first fiber Bragg grating and said second Bragg grating of said sensor unit are protected by a specific material, respectively, having a different strain sensitivity.

11. The system of claim 7, wherein said power reading unit further comprises a first fiber coupler, a second fiber coupler, and a detection port;

the broadband light reaches said sensor unit through said first fiber coupler and said second fiber coupler, sand said first fiber Bragg grating and said second fiber Bragg grating generate the light that corresponds to the intersection between the spectra of the two FBGs to said detection port through said second fiber coupler.

12. The system of claim 7, wherein said power reading unit further comprises an optical circulator and a detection port;

the broadband light reaches said sensor unit through said optical circulator, and said first fiber Bragg grating and said second fiber Bragg grating reflect the light that corresponds to the intersection between the spectra of the two FBGs to said detection port through said optical circulator.

13. The system of claim 7, wherein said calibration system further comprises a third fiber coupler and a referencing port;

said broadband light reaches said sensor unit through said third fiber coupler and said power reading unit, and said referencing port detecting the light from said broadband light source to monitor the optical power entering the strain sensing system.

14. A dual fiber Bragg grating strain sensor system, which comprises:
a broadband light source;
a power splitter;
a plurality of power reading units; and
a plurality of sensor units, each sensor unit having two fiber Bragg gratings (FBGs) including a first fiber Bragg grating written on a first fiber and a second fiber Bragg grating written on a second fiber, the first fiber Bragg grating is placed adjacent to the second fiber Bragg grating, wherein the broadband light reaches each said power reading unit through said power splitter and reaches each sensor unit through each said power reading unit, and each said first fiber Bragg grating and each said second fiber Bragg grating reflect a light that corresponds to an intersection between a spectra of the two FBGs to each said power reading unit, said power reading unit detecting a signal corresponding to the reflected light.

15. The system of claim 14, wherein said first fiber Bragg grating and said second Bragg grating of each said sensor unit have a same temperature sensitivity.

16. The system of claim 14, wherein one of said first fiber Bragg grating and said second Bragg grating of said sensor unit is protected by a specific material having a different strain sensitivity.

17. The system of claim 14, wherein both said first fiber Bragg grating and said second Bragg grating of said sensor unit are protected by a specific material, respectively, having a different strain sensitivity.

18. The system of claim 14, wherein each said power reading unit further comprises a first fiber coupler, a second fiber coupler, and a detection port;

wherein the broadband light split by said power splitter reaches each said sensor unit through said first fiber coupler and second fiber coupler of each said power reading unit, and said first fiber Bragg grating and said second fiber Bragg grating of each said sensor unit generate reflect the light that corresponds to the intersection between the spectra of the two FBGs to said detection port through said second coupler of each said power reading unit.

19. The system of claim 14, wherein each said power reading unit further comprises an optical circulator and a detection port separately;

the broadband light split by said power splitter reaches each said sensor unit through each said optical circulator, and said first fiber Bragg grating and said second fiber Bragg grating of each said sensor unit reflect the light that corresponds to the intersection between the spectra of the two FBGs to said detection port through said optical circulator of each said power reading unit.

20. The system of claim 18, further comprising a referencing port detecting the light from said broadband light source to monitor the optical power entering the strain sensing system.

21. A dual fiber Bragg grating strain sensor system, which comprises:

a broadband light source;

a power splitter;

a plurality of calibration systems;

a plurality of power reading units; and a plurality of sensor units, each sensor unit having two fiber Bragg gratings (FBGs) including a first fiber Bragg grating written on a first fiber and a second fiber Bragg grating written on a second fiber, the first fiber Bragg grating is placed adjacent to the second fiber Bragg grating, wherein the broadband light split by said power splitter reaches each said sensor unit through each said calibration system and each said power reading unit, and said first fiber Bragg grating and said second fiber Bragg grating of each sensor unit reflect a light that corresponds to an intersection between the a spectra of the two FBGs to each said power reading unit, said power reading unit detecting a signal corresponding to the reflected light.

22. The system of claim 21, wherein said first fiber Bragg grating and said second Bragg grating of each said sensor unit have a same temperature sensitivity.

23. The system of claim 21, wherein one of said first fiber Bragg grating and said second Bragg grating of said sensor unit is protected by a specific material having a different strain sensitivity.

24. The system of claim 21, wherein both said first fiber Bragg grating and said second Bragg grating of said sensor unit are protected by a specific material respectively having a different strain sensitivity.

25. The system of claim 21, wherein each said power reading unit further comprises a first fiber coupler, a second fiber coupler, and a detection port;

the broadband light reaches each said sensor unit through said first fiber coupler and said second fiber coupler of each said power reading unit, and said first fiber Bragg grating and said second fiber Bragg grating of each sensor unit reflect the light that corresponds to the intersection between the spectra of the two FBGs to said detection port through said second fiber coupler of each said power reading unit.

26. The system of claim 21, wherein each said power reading unit further comprises an optical circulator and a detection port separately;

the broadband light reaches each said sensor unit through each said optical circulator, and said first fiber Bragg grating and said second fiber Bragg grating of each said sensor unit reflect the light that corresponds to the intersection between the spectra of the two FBGs to said detection port through each said optical circulator of each said power reading unit.

27. The system of claim 21, wherein each said calibration system further comprises a third fiber coupler and a referencing port separately;

the broadband light reaches each said sensor unit through said third fiber coupler of each said calibration system and said power reading unit, and said referencing port of each said calibration system detecting the light from said broadband light source to monitor the optical power entering each strain sensing system.

28. The system of claim 19, further comprising a referencing port detecting the light from said broadband light source to monitor the optical power entering the strain sensing system.

* * * * *